US008645835B2

(12) United States Patent
Fry (10) Patent No.: US 8,645,835 B2
(45) Date of Patent: Feb. 4, 2014

(54) SESSION INITIATION USING SUCCESSIVE INPUTS

(75) Inventor: Christopher E. Fry, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1070 days.

(21) Appl. No.: 12/141,072

(22) Filed: Jun. 17, 2008

(65) Prior Publication Data

US 2009/0313548 A1 Dec. 17, 2009

(51) Int. Cl.
*G06F 3/00* (2006.01)
(52) U.S. Cl.
USPC ........................................ 715/733; 715/751
(58) Field of Classification Search
USPC .................. 715/733, 741, 743, 751
See application file for complete search history.

(56) References Cited

U.S. PATENT DOCUMENTS

| | | | |
|---|---|---|---|
| 6,754,904 B1 | 6/2004 | Cooper et al. | |
| 7,188,153 B2 | 3/2007 | Lunt et al. | |
| 7,653,931 B1 * | 1/2010 | Peterson et al. | 726/2 |
| 2002/0171676 A1 * | 11/2002 | Yampel et al. | 345/733 |
| 2006/0020815 A1 * | 1/2006 | Varghese et al. | 713/182 |
| 2006/0242581 A1 | 10/2006 | Manion et al. | |
| 2007/0060380 A1 | 3/2007 | McMonigle et al. | |
| 2007/0067392 A1 | 3/2007 | Torres et al. | |
| 2007/0101368 A1 | 5/2007 | Jacoby et al. | |
| 2007/0156805 A1 | 7/2007 | Bristol et al. | |
| 2007/0220575 A1 | 9/2007 | Cooper et al. | |
| 2007/0255807 A1 | 11/2007 | Hayashi et al. | |
| 2007/0260724 A1 * | 11/2007 | Rowley | 709/223 |
| 2008/0052245 A1 * | 2/2008 | Love | 705/76 |
| 2008/0244700 A1 * | 10/2008 | Osborn et al. | 726/2 |
| 2008/0287190 A1 * | 11/2008 | Fulton et al. | 463/42 |
| 2009/0172810 A1 * | 7/2009 | Won et al. | 726/19 |

OTHER PUBLICATIONS

"Social-Networking TV", Aug. 14, 2007, p. 1.
Topolsky, "Apple TV Patent Filing Boasts Video Chat, Widgets, Broadcast Capability", 2003-2008, Weblogs, Inc., pp. 6.
"IPSoft iVision", Netris, 2006-2008, pp. 3.

* cited by examiner

*Primary Examiner* — Rashawn Tillery
(74) *Attorney, Agent, or Firm* — Wolfe-SBMC (57) ABSTRACT

Session initiation using successive inputs is described. In an implementation, a determination is made as to when a sufficient number of successive inputs have been collected to uniquely identify two or more clients from a plurality of clients. Each of the successive inputs is input via a respective user interface output by a respective client. Responsive to the determination, an interactive session is initiated involving the two or more clients that were uniquely identified.

17 Claims, 6 Drawing Sheets

SESSION INITIATION USING SUCCESSIVE INPUTS

BACKGROUND

User may utilize a variety of different clients to access content, such as televisions, personal computers, personal digital assistants, digital music players, game consoles, and so on. However, each of these devices may be optimized for different types of interaction. Accordingly, input techniques that may be relatively easy to perform using a client having "rich" input devices (e.g., a keyboard and mouse) may be considerably more difficult to perform when interacting with another type of device (e.g., a client having a remote control, a digital music player, and so on).

SUMMARY

Session initiation using successive inputs is described. In an implementation, a determination is made as to when a sufficient number of successive inputs have been collected to uniquely identify two or more clients from a plurality of clients. Each of the successive inputs is input via a respective user interface output by a respective client. Responsive to the determination, an interactive session is initiated involving the two or more clients that were uniquely identified.

In an implementation, one or more computer-readable media include instructions that are executable to output a user interface having a plurality of screens that are displayable in succession, one after another. Each of the screens includes a plurality of icons that are selectable to form a unique identifier to cause an interactive session to be initiated.

In an implementation, a server includes a processor and memory. The memory is to maintain one or more modules that are executable on the processor to provide an option to initiate an interactive session when a sufficient number of successive inputs have been received to uniquely identify a subset of a plurality of clients. Each of the successive inputs involves interaction with a user interface output by each of the plurality of clients.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

The variety of clients that are available to users is ever increasing. However, the techniques (and consequently the ease) at which users traditionally interacted with these different clients may vary from client to client. For example, a user interacting with a traditional television (TV) using a remote control device may find it difficult to enter text when compared with a traditional personal computer using a keyboard, which may make it difficult for the users to identify themselves and so on.

Session initiation techniques are described that use successive inputs. In an implementation, a user interface is provided for output by clients, such as televisions, mobile phones, and so on. The user interface includes portions (e.g., icons) that are selectable by a user, such as through interaction with a remote control device that is communicatively coupled to the television. Successive inputs may be provided through continued interaction with the user interface through manual manipulation of the remote control, which may be utilized for a variety of different purposes.

For example, two users may converse using a telephone and decide to initiate an interactive session using respective televisions. For instance, the interactive session may provide for social networking that enables the users to interact via the televisions while a television program is being output. To initiate the interactive session, the users may agree (e.g., via the telephone) to select a particular icon output in a user interface on the respective televisions, such as an icon of a fireman.

The users may continue to provide inputs in a similar manner (e.g., by selecting icons) until the users may be uniquely identified by a network operator from other users that may also be entering inputs at the same time, such as through successive selection of portions output in the user interface via successive screens. For instance, the network operator may analyze inputs received from a plurality of clients in a similar manner until matching inputs are detected from two or more clients that uniquely identify the two or more clients from other clients. In other words, the matching inputs may be used to identify a subset of the plurality of clients that wish to participate in an interactive session with each other.

Once uniquely identified, the users (through respective clients) may be provided with an option to initiate the interactive session, which in this example is to initiate the social networking session via respective televisions. Thus, the users may provide a minimal number of inputs to perform this unique identification and do so in a manner that is efficient even on "thin" clients. Further discussion of identification of a subset of clients and session initiation using successive inputs may be found in relation to the following sections.

In the following discussion, an example environment and systems are first described that are operable to perform techniques to initiation a session using successive inputs. Example procedures are then described that may be employed in the example environment, as well as in other environments. Although use of successive inputs is described in a television environment in the following discussion, it should be readily apparent that a wide variety of environments may that may leverage success inputs techniques to identify a subset of a plurality of clients without departing from the spirit and scope thereof.

Example Environment

Figure 1:
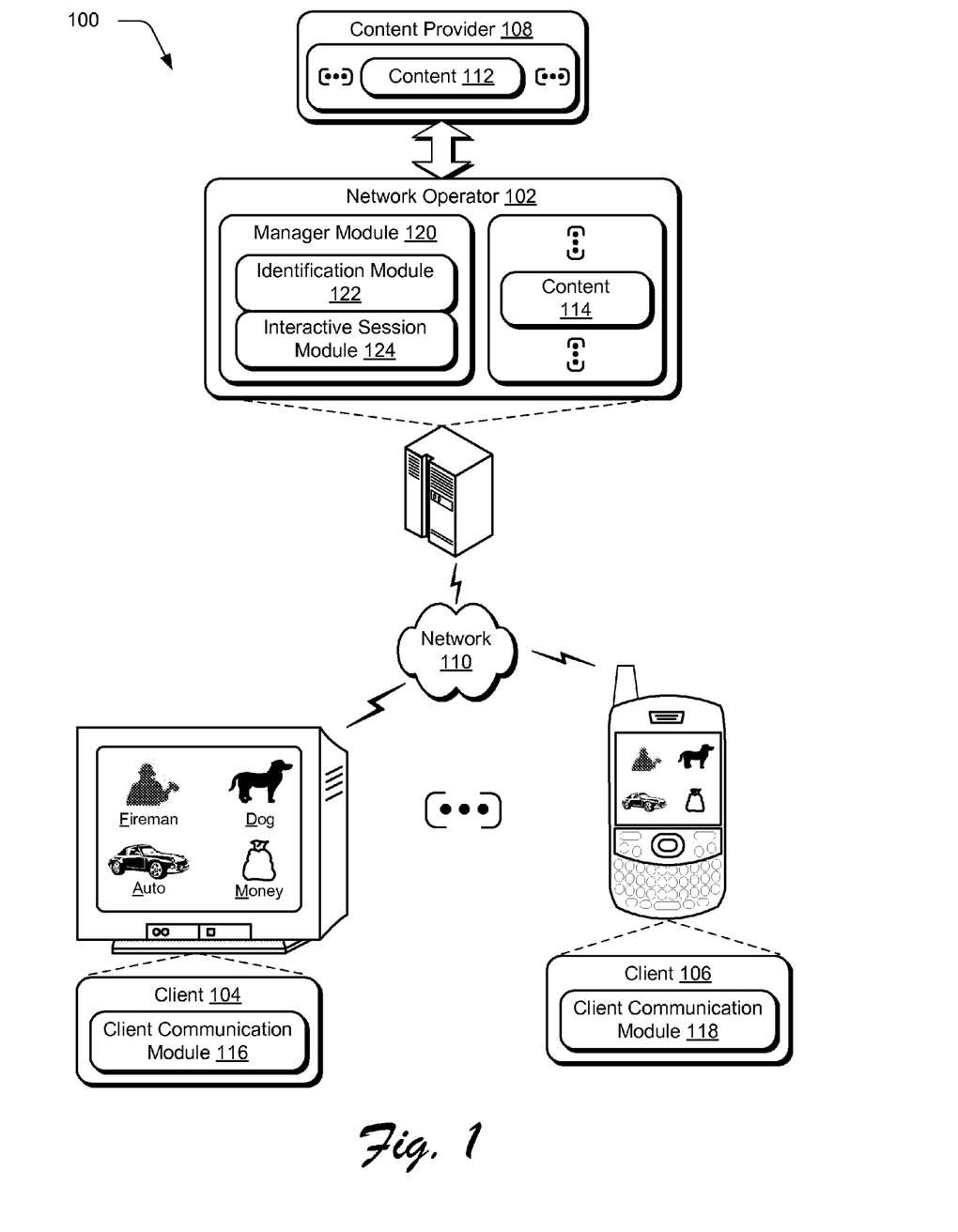
FIG. 1 is an illustration of an environment in an example implementation that is operable to employ techniques to initiate a session using successive inputs.

FIG. 1 is an illustration of an environment 100 in an example implementation that is operable to employ techniques involving successive inputs to identify a client. The illustrated environment 100 includes a network operator 102 (e.g., a "head end"), first and second clients 104, 106 and a content provider 108. The network operator 102, the first client 104 and the second client 106 are illustrated as being communicatively coupled, one to another, via a network 110. It should be readily apparent that the content provider 108 may also be communicatively coupled to the network 110 or via another technique, such as the use of one or more computer-readable media.

Although a single network 110 is shown, the network 110 may be representative of a plurality of network connections that may be achieved using a single network or multiple networks, e.g., network 110 may be implemented via the Internet, a cable network, an "over the air" broadcast network, a satellite network, and so on. In the following discussion, the network operator 102, the clients 104, 106, and the content provider 108 may also be representative of one or more entities, and therefore by convention reference may be made to a single entity (e.g., the client 104) or multiple entities (e.g., the clients 104, the plurality of clients 104, and so on).

The clients 104, 106 may be configured in a variety of ways. For example, the clients 104, 106 may be configured as a computer that is capable of sending and/or receiving data over the network 110, such as a television as illustrated for client 104, a mobile station, an entertainment appliance (e.g., a game console and game controller), a set-top box communicatively coupled to a display device as illustrated, a wireless phone as illustrated for client 106, and so forth. Thus, the clients 104, 106 may range from full resource devices with substantial memory and processor resources (e.g., television-enabled personal computers, television recorders equipped with hard disk, "smart" phones) to a low-resource device with limited memory and/or processing resources (e.g., traditional set-top boxes, traditional wireless phones). In the following discussion, clients 104, 106 may also describe logical clients that initiate one or more operations of the respective client, such as software, a user and so on.

Communication of content to the clients 104, 106 may be performed in a variety of ways. For example, the clients 104, 106 may be communicatively coupled to the content provider 108 (which may be representative of one or more content providers) using a packet-switched network, e.g., the Internet. Accordingly, the clients 104, 106 may receive one or more items of content 112 directly from the content provider 108, e.g., via one or more websites. The content 112 may include a variety of data, such as television programming, video-on-demand (VOD) files, one or more results of remote application processing, and so on. A variety of other examples are also contemplated, such as by using an indirect distribution example in which the content 112 is communicated first to the network operator 102 for distribution to the clients 104, 106.

Content 112, as illustrated in FIG. 1, is communicated to the network operator 102 (e.g., via a network connection and/or computer-readable media) and may be stored as one or more items of content 114. The content 114 may be the same as or different from the content 112 received from the content provider 108. The content 114, for instance, may include additional data for broadcast to the client 104. For example, the content 114 may include electronic program guide (EPG) data from an EPG database for broadcast to the client 104 utilizing a carousel file system and an out-of-band (OOB) channel. Distribution from the network operator 102 to the clients 104, 106 over network 110 may be accommodated in a number of ways, including cable, radio frequency (RF), microwave, digital subscriber line (DSL), wireless network, and satellite using a variety of networks as previously described for network 110.

The clients 104, 106, as previously stated, may be configured in a variety of ways to receive the content 114 via the network 110. The clients 104, 106 typically include hardware and software to transport and decrypt content 114 received from the network operator 102 for output and/or rendering, e.g., by the illustrated display devices. Although display devices are shown, a variety of other output devices are also contemplated, such as speakers. Further, although each of the clients 104, 106 is illustrated as including a display device, it should be readily apparent that a client may output content in a variety of ways, such as an output when configured as a set-top box to a display device.

The clients 104, 106 include respective client communication modules 116, 118 that are representative of functionality of the respective clients 104, 106 to control content interaction, such as through the use of one or more "control functions". The control functions may include a variety of functions to control output of content, such as to control volume, change channels, select different inputs, configure surround sound, and so on. The control functions may also provide non-linear playback of the content 116 (i.e., time shift the playback of the content 116) such as pause, rewind, fast forward, slow motion playback, and the like when the clients 104, 106 are configured with time-shifting functionality, e.g., as personal video recorders.

The client communication modules 116, 118 may also be representative of functionality to restore the content 114 to the original encoded format as received from the content provider 108, remove encryption (e.g., when employing one or more digital rights management techniques), and so on. For example, when the content 114 is received by the client communication modules 116, 118, the content 114 may be decrypted and/or decompressed for rendering.

The network operator 102 is illustrated as including a manager module 120. The manager module 120 is representative of functionality to configure content 114 for output (e.g., streaming) over the network 110 to the clients 104, 106. The manager module 120, for instance, may configure content 112 received from the content provider 108 to be suitable for transmission over the network 110, such as to "packetize" the content 112 for distribution over the Internet, configuration for a particular broadcast channel, and so on.

Thus, in the environment 100 of FIG. 1, the content provider 108 may provide the content 112 to a multiplicity of network operators, an example of which is illustrated as network operator 102. The network operator 102 may then stream the content 114 over a network 110 to a multitude of clients, examples of which are illustrated as clients 104, 106. The clients 104, 106 may then output the content 114 directly and/or store the content 114 for later output, such as when the clients 104, 106 are configured to include personal video recorder (PVR) functionality.

The network operator 102, and more particularly the manager module 120, is further illustrated as including an identification module 122 and an interactive session module 124. The identification module 122 is representative of functionality of the network operator 102 to identify a subset of the plurality of clients, e.g., clients 104, 106 from other clients. This identification may be performed in a variety of ways.

In an implementation, the identification module 122 identifies the clients 104, 106 based on interaction with respective user interfaces that are output through operation of respective client communication modules 116, 118. For example, a user interacting with client 104 and a user interacting with client 106 may provide successive inputs that match. These matching successive inputs may then be used to uniquely identify clients 104, 106 from other clients that are also providing inputs. In an implementation, this identification is performed in real time by the identification module 122. Therefore, in this implementation a unique identifier formed through interaction with the user interface output by the client communication modules 116, 118 may be unique for that particular point in time and not each point in time. In other words, a unique identifier may be unique to the particular point in time at which the identification is being performed. A variety of other examples are also contemplated, further discussion of which may be found in relation to the following figures.

The manager module 120 is further illustrated as including an interactive session module 124. The interactive session module 124 is representative of functionality of the network operator 102 to initiate and/or manage an interactive session between clients, e.g., client 104, 106. A variety of interactive sessions are contemplated, such as social networking sessions which may include a chat session, an instant messaging session, video conferencing, and so on.

For example, the network operator 102, through execution of the interactive session module 124, may provide a social networking session between client 104 and client 106 concurrently with the output of content 114. The clients 104, 106, for instance, may output a television program and have comments communicated to each other regarding the television program (e.g., communication of a "thumbs up" in response to a particular scene in a television program) and may even communicate comments regarding other subjects. In this way, the clients 104, 106 may interact in a manner related to content 114 communicated to the clients 104, 106 via the network 110 from the network operator 102. Additionally, the interactive session (initiated by the interactive session module 124) may leverage the identification techniques of the identification module 122 to identify which clients desire initiation of an interactive session, further discussion of which may be found in relation to the following systems.

Although the functionality of the identification module 122 and the interactive session module 124 are illustrated as being provided by the network operator 102, it should be readily apparent that this functionality may be provided in a variety of ways by a variety of devices. For example, the functionality represented by the identification module 122 and/or the interactive session module 124 may be incorporated by one or more of the clients 104, 106, by a third party stand-alone system that is separate from the network operation 102, and so on.

Figure 2:
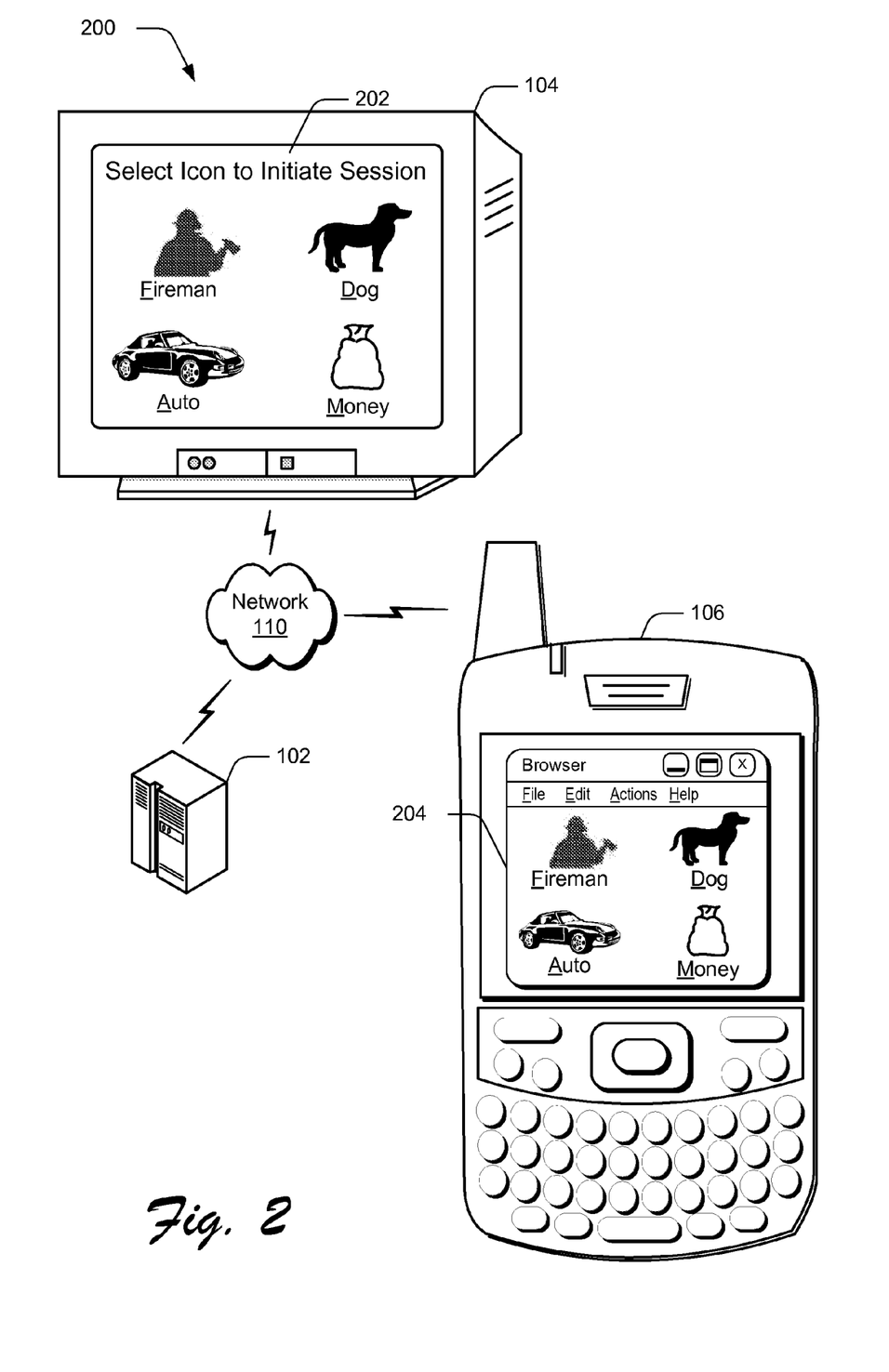
FIG. 2 is an illustration of a system in an example implementation in which clients of FIG. 1 are illustrated as outputting respective user interfaces to form a unique identifier.

FIG. 2 depicts a system 200 in an example implementation in which the clients, 104 106 of FIG. 1 are illustrated as outputting respective user interfaces, 202, 204 to form a unique identifier. Clients 104, 106 are illustrated as outputting respective user interfaces 202, 204. Each of the user interfaces are illustrated as including a plurality of icons that are selectable, the illustrated examples including a fireman, a dog, an auto, and money. A user interacting with the user interface 202 (client 104, for instance) may select one of the icons using a remote control device. Likewise, a user interacting with the user interface 204 displayed by clients 106 may also select one of the icons, such as by using a touch screen, a cursor control device (e.g., a trackball), and so on.

The order in which the users select icons output by the respective clients 104, 106 may be used to form a unique identifier that may be a basis for initiating an interactive session between the clients 104, 106. For example, users of the clients 104, 106 may talk over a telephone network and decide to watch a particular item of content (e.g., a sporting event) and engage in an interactive session regarding the particular item of content. For example, the interactive session may involve predicting plays that may be run in a sporting event, share statistics, given "thumbs up" or "thumbs down" in response to actions taken during a sporting event, and so on.

Accordingly, each of the clients 104, 106 may output the respective user interfaces 202, 204, which in illustrated instance of FIG. 2 include icons that are selectable as previously described. The users may then agree while speaking over the telephone network to a particular order for selection of the icons that may be used to initiate the interactive session. For instance, the users may select the icons in order, such as a fireman, the dog, the auto, and the money. Selection of these icons may be communicated over the network 110 to the network operator 102 so that the network operator 102 may identify the clients 104, 106 from other clients that may also wish to initiate an interactive session.

The data communicated to the network operator 102 as a result of the selection may take a variety of forms, such as a word that identifies each of the icons (e.g., fireman, dog, auto, and money), a first letter of each of the icons (e.g, F, D, A, M), a numerical representation, and so on.

In an implementation, data representing this selection is communicated over the network 110 to the network operator 102 in real time until a sufficient number of successive inputs are received from the respective clients 104, 106 to uniquely identify the clients 104, 106 from other clients that may also wish to initiate inactive session. The interactive session may then be initiated for the subset of clients (e.g., clients 104, 106) that have been uniquely identified.

Thus, the users may continue to provide inputs through selection of the icons in the user interfaces 202, 204 until the users (and more particularly the clients 104, 106) may be uniquely identified by the network operator 102. Once the users (again, and more particularly clients 104, 106) may be uniquely identified by the network operator 102 as desiring an interactive session, the clients 104, 106 may cease providing inputs through interaction with the respective user interfaces 202, 204.

Figure 3:
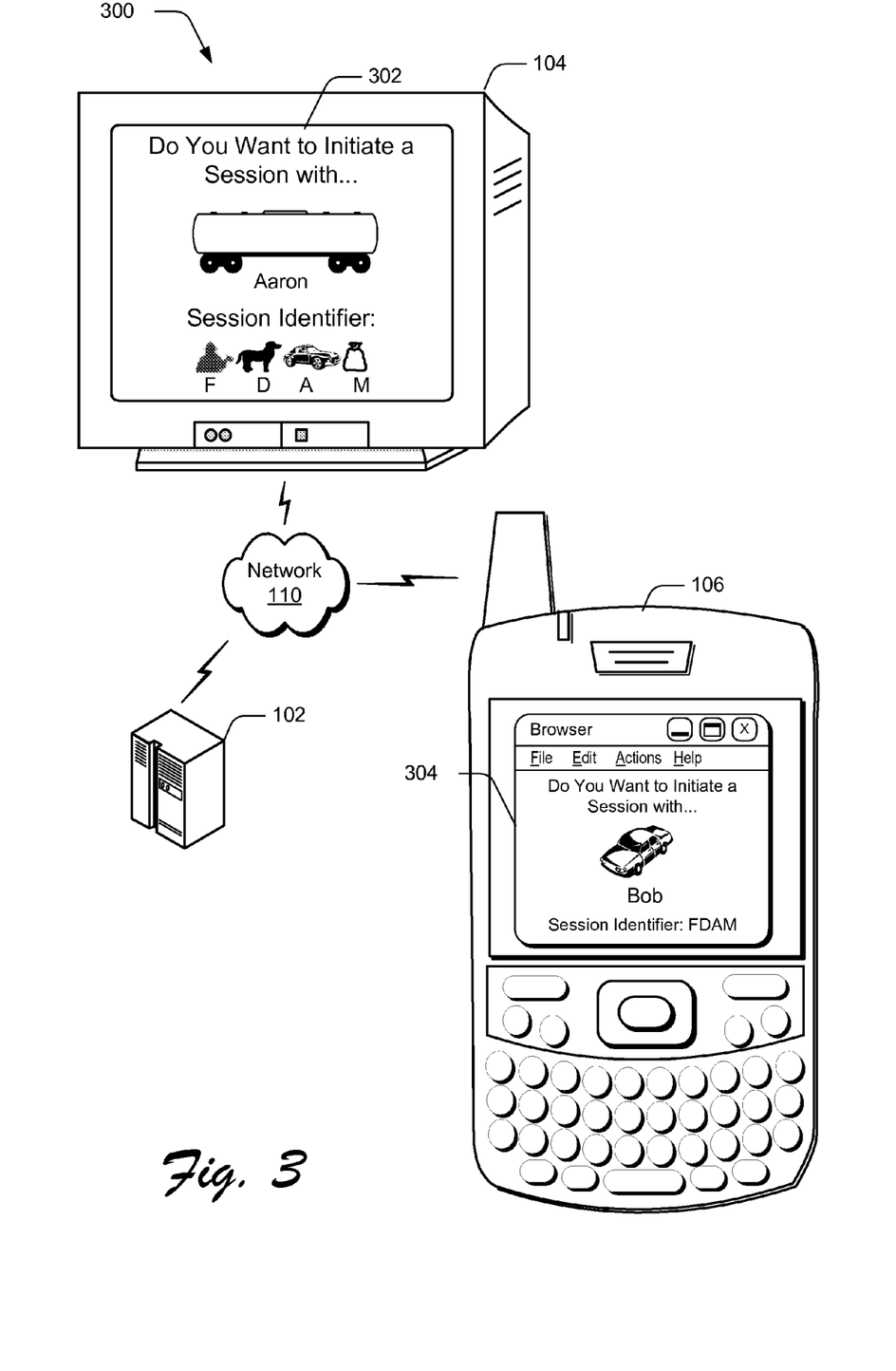
FIG. 3 is an illustration of a system in an example implementation in which a confirmation screen is output in respective user interfaces by the clients of FIG. 2 to confirm that initiation of an interactive session with a particular client is desired.

FIG. 3 depicts a system 300 in an example implementation in which a confirmation screen is output in respective user interfaces 302, 304 by the clients 104, 106 to confirm that initiation of an interactive session with a particular client is desired. The user interfaces 302, 304 of FIG. 3 each include an identifier of the other client with which the interactive session is to be initiated, which in the illustrated instance includes a name of the user along with an avatar.

The user interfaces 302, 304 of FIG. 3 also include a confirmation of the unique identifier used to initiate the interactive session. The session identifier may be output in a variety of ways such that the user may confirm that the session identifier corresponds with the session identifier that the user intended to input to initiate the session. For example, in the user interface 302 output by client 104, the session identifier includes each of the icons selected through interaction with the user interface 202 of FIG. 2 along with a first letter of a name of the respective icon.

In the user interface output by client 106, a first letter of the name of the icons selected in the user interface 204 of FIG. 2 are output without the icon due to display device constraints (e.g., an amount of available display area on the display device of the client 106), which in the illustrated instance are the letters "F", "D", "A", and "M". Although interaction with a single screen of a user interface to select portions (e.g., icons) to generate a unique identifier have been described in relation to FIGS. 1 and 2, a user interface may also provide a plurality of successive screens to generate a unique identifier, an example of which may be found in relation to the following figure.

Figure 4:
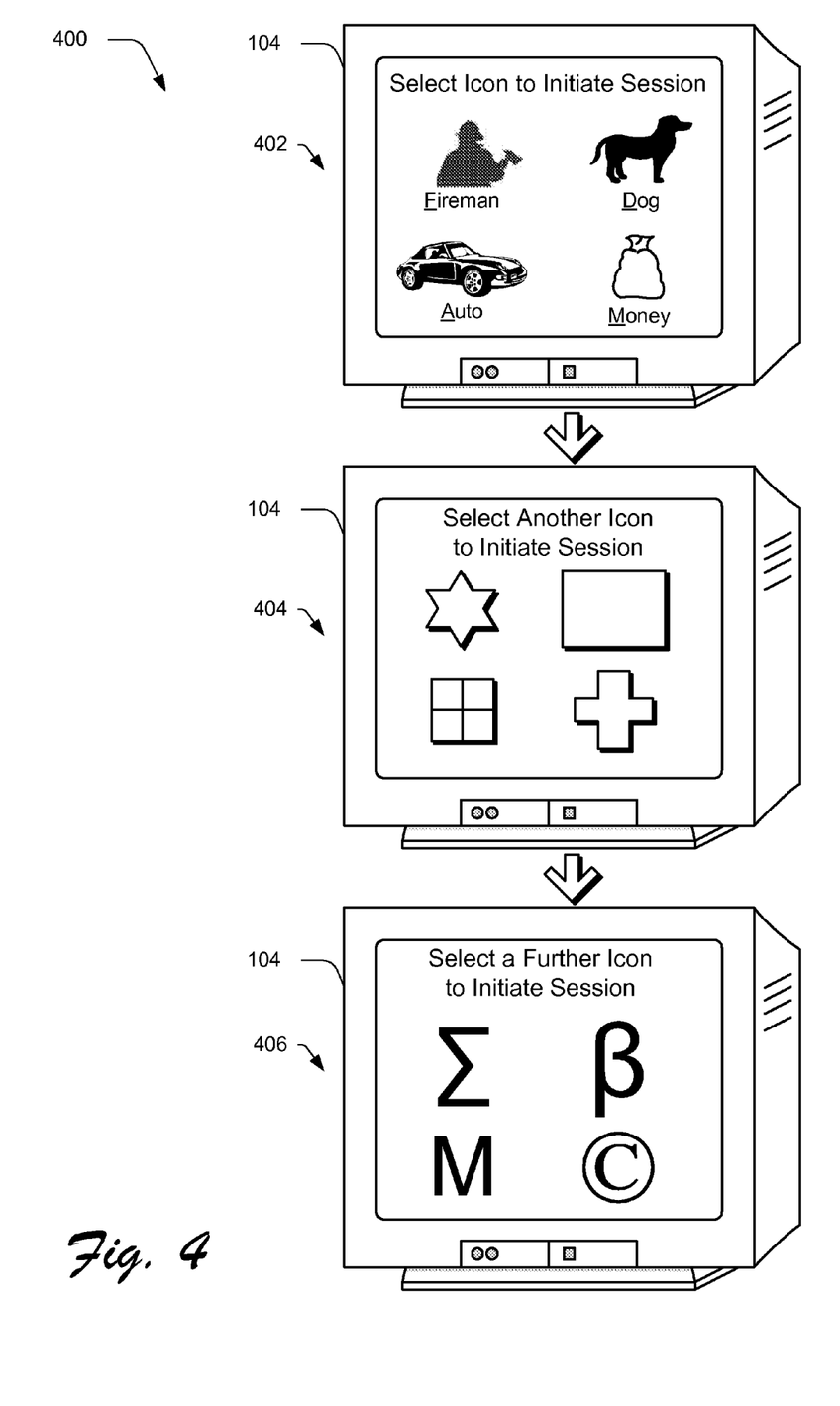
FIG. 4 is an illustration of a client of FIGS. 1-3 as outputting successive screens in a user interface having portions that are selectable to form a unique identifier.

FIG. 4 depicts the client 104 of FIGS. 1-3 as outputting successive screens 402, 404, 406 in a user interface having portions that are selectable to form a unique identifier. In the embodiment illustrated in FIG. 4, the client 104 outputs a plurality of successive screens 402, 404 and 406 to form the unique identifier previously described. For example, the user may interact with the first screen 402 which has icons that are selectable to form a first part of the unique identifier. Likewise, the user may interact with a second screen 404 to select one or more portions that include a plurality of shapes, examples of which are illustrated as a star, a box, a matrix and a cross. Further, the user may interact with a third screen 406 of the user interface that includes symbols and letters, examples of which are illustrated as a summation symbol, a beta symbol, a letter "M" and a copyright symbol. Thus, in this example each of the successive screens includes different portions that are selectable to form a unique identifier.

In an implementation, each successive screen that is output is based on a portion selected in a previous screen. For example, a user that selects the auto icon in the first screen 402 may be presented with the second screen 404 that include shapes, whereas a user that selects the dog icon in the first screen 402 may be presented with the third screen 406. A variety of other examples are also contemplated, further discussion of which may be found in relation to the following procedures.

Generally, any of the functions described herein can be implemented using software, firmware, hardware (e.g., fixed-logic circuitry), manual processing, or a combination of these implementations. The terms "module", "functionality" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory devices. The features of the techniques described herein are platform-independent, meaning that the techniques may be implemented on a variety of commercial computing platforms having a variety of processors.

Example Procedures

The following discussion describes techniques that may be implemented utilizing the previously described environment, systems, user interfaces and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and systems 200-400 of FIGS. 2-4, respectively.

Figure 5:
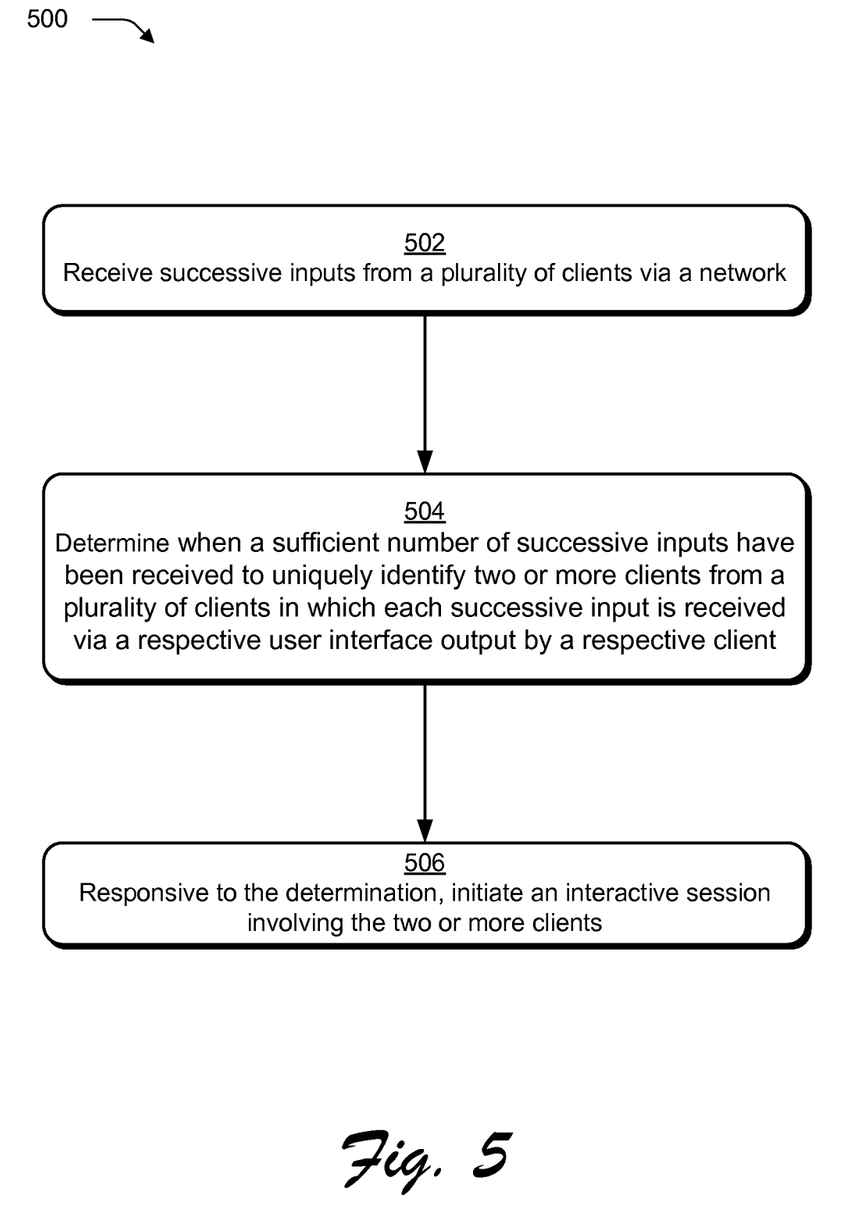
FIG. 5 depicts a flowchart describing a procedure in an example implementation in which successive inputs are received via a plurality of clients which are used to identify a subset of clients that desire initiation of an interactive session, one with another.

FIG. 5 depicts a procedure 500 in an example implementation in which successive inputs are received via a plurality of clients that are used to identify a subset of clients that desire initiation of an interactive session, one with another. Successive inputs are received from a plurality of clients via a network (block 502). For example, the network operator 102 may receive inputs via network 110 from client 104 and client 106 as well as a plurality of other clients. These inputs may be provided in a variety of ways, such as through selection of portions of a user interface, e.g., icons and so on.

A determination is made as to when a sufficient number of successive inputs have been received to uniquely identify two or more clients from the plurality of clients in which each of the successive inputs is received via a respective user interface output by a respective one of the clients (block 504). For example, the user interface may include a relatively minimal number of portions that are selectable to ease selection by a user interacting with a "thin" client, e.g., a television. However, when a significant number of clients desire to initiate an interactive session, the network operator may receive a significant number of inputs thereby making it difficult to determine which clients desire to interact via an interactive session, one with another, when a minimal number of inputs are received from a significant number of clients.

Accordingly, the network operator 102 may continue to collect inputs from the clients over the network 110 (e.g., in real time) until a subset of the clients may be uniquely identified, e.g., such as a number that falls within the range that defines a number of clients that are likely to participate in an interactive session (such as 2-8 clients). Therefore, in periods when a relatively low number of clients desire interaction via an interactive session, the network operator 102 may uniquely identify a subset of the clients using a relatively small number of inputs when compared with a number of inputs received when a relatively large number of clients desire initiation of interactive sessions.

Responsive to the determination, an interactive session is initiated involving the two or more clients (block 506). For example, the network operator 102 may initiate a chat session, an instant messaging session, or other social networking technique. Another example of identification of a subset of clients, which may be used to initiate an interactive session may be found in relation to the following figure.

Figure 6:
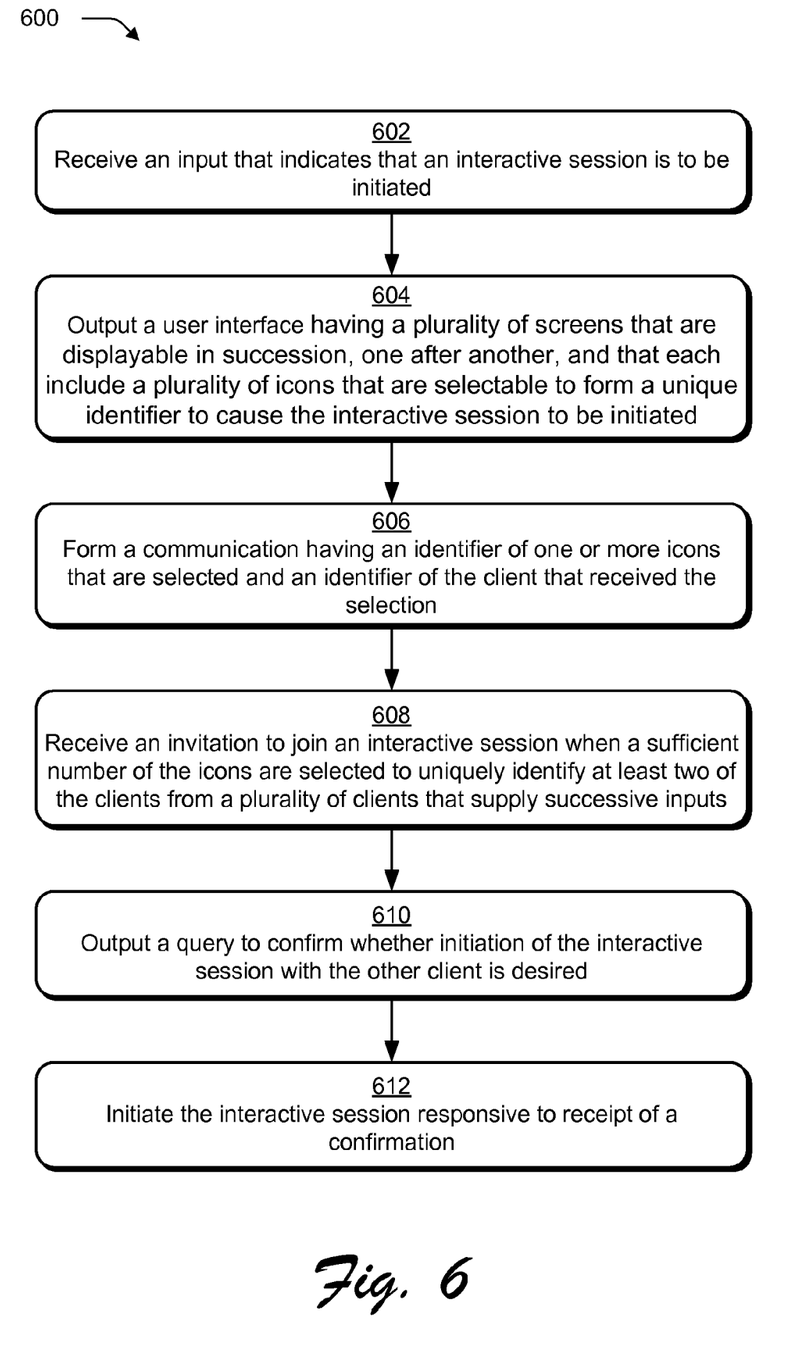
FIG. 6 depicts a flowchart describing a procedure in an example implementation in which a query is output to confirm initiation of an interactive session.

FIG. 6 depicts a procedure 600 in an example implementation in which a query is output to confirm initiation of an interactive session. An input is received that indicates an interactive session is to be initiated (block 602). For example, a user may press a button on the remote control, select a portion of an electronic programming interface, and so on.

A user interface is output having a plurality of screens that are displayable in succession, one after another, and that each include a plurality of icons that are selectable to form a unique identifier to cause the interactive session to be initiated (block 604). For example, the client 104 of FIG. 4 is illustrated as outputting a plurality of screens 402, 404 and 406. Additionally, each of the screens includes a plurality of icons that are selectable by a user, such as through use of a remote control device, cursor control device, a touchscreen and so on.

A communication is formed having an identifier of one or more icons that are selected and an identifier of the client that received the selection (block 606). The communication, for instance, may be communicated to the network operator via a webpage provided by the network operator 102 to the client 104, which is output at the client 104 via a browser.

When a sufficient number of the icons are selected to uniquely identify at least two of the clients from a plurality of clients that supply successive inputs, an invitation is received to join an interactive session (block 608). For example, a query may be output to confirm whether initiation of an interactive session with a client is desired (block 610). Thus, the query may be used to confirm whether the client wishes to join an interactive session. In this way, the network operator 102 may confirm whether each of the clients desires to initiate the interactive session with other clients that are identified in a confirmation screen. An interactive session may then be initiated responsive to receipt of a confirmation (block 612), an example of which was previously described in relation to FIG. 3.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    determining when a sufficient number of matching successive inputs for participation in an interactive session have been collected from two or more clients at a particular point in time to uniquely identify, at the particular point in time, the two or more clients for participation in the interactive session with one another from a plurality of said clients in which each said matching successive input is input via a respective user interface output by a respective said client, and input of each said matching successive input to the user interface causing a next screen of the user interface to be displayed for input of another said matching successive input unless the sufficient number of matching successive inputs is determined, the matching successive inputs are input via a series of said screens of the user interface, each said screen having one or more portions that are selectable, at least one said portion is an icon; and
    responsive to the determining, initiating the interactive session involving the two or more said clients.

2. A method as described in claim 1, wherein the matching successive inputs are input without using a keyboard.

3. A method as described in claim 1, wherein at least one said portion includes one or more alphanumeric identifiers that represent respective said inputs.

4. A method as described in claim 1, wherein the determining includes comparing successive inputs received by the plurality of clients, one with another, to find a unique sequence that, when matching, uniquely identifies the two or more said clients from other said clients that also provided successive inputs.

5. A method as described in claim 1, wherein the determining includes identifying a subset of said clients that have received said matching successive inputs, one to another.

6. A method as described in claim 5, wherein the subset specifies a range of said clients.

7. A method as described in claim 1, wherein the determining is performed in real time as the matching successive inputs are received, one after another.

8. A method as described in claim 1, wherein the interactive session is a chat session.

9. A method as described in claim 8, wherein the chat session is output concurrently with television content.

10. A method as described in claim 1, wherein the interactive session provides social networking.

11. A method as described in claim 1, wherein the initiating includes outputting a query by each of the two or more said clients to confirm whether initiation of the interactive session with the other said client is desired.

12. One or more computer-readable media comprising instructions that are executable by one or more processors to perform operations comprising:
    outputting a user interface having a plurality of screens that are displayable in succession, one after another, and that each include a plurality of icons that are selectable at a particular point in time to form a unique identifier at the particular point in time, selection of one of the plurality of icons from said screens causing a next said screen to be displayed until an interactive session is initiated between two or more clients, from a plurality of said clients, that receive a matching selection of said icons that form the unique identifier at the particular point in time.

13. One or more computer-readable media as described in claim 12, wherein at least two said screens include respective said icons that are different, one to another.

14. One or more computer-readable media as described in claim 12, wherein the user interface is navigable using a television remote control device.

15. One or more computer-readable media as described in claim 12, wherein the user interface is navigable using a game controller.

16. One or more computer-readable media as described in claim 12, wherein the user interface is output by a portable music player.

17. A server comprising:
    a processor; and
    memory to maintain one or more modules that are executable on the processor to provide an option to initiate an interactive session when a sufficient number of matching successive inputs have been received from a subset of a plurality of clients at a same point in time to uniquely identify, at the same point in time, the subset of the plurality of clients for participation in an interactive session with one another in which each said matching successive input involves interaction with a user interface output by each of the plurality of clients, each user interface configured to display a succession of screens, receive one said matching successive input through each said screen, and display a next said screen unless the sufficient number of matching successive inputs have been received, the matching successive inputs are received through display of a plurality of icons on each said screen of the succession of screens in each said user interface.

* * * * *